United States Patent
Miyazaki et al.

(10) Patent No.: US 7,852,766 B2
(45) Date of Patent: Dec. 14, 2010

(54) DETECTION METHOD, DETECTING DEVICE, REFERENCE VALUE CALCULATING DEVICE AND RECORDING MEDIUM

(75) Inventors: Hideaki Miyazaki, Kawasaki (JP);
Masanobu Morinaga, Kawasaki (JP);
Noriyuki Fukuyama, Kawasaki (JP);
Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 11/925,230

(22) Filed: Oct. 26, 2007

(65) Prior Publication Data

US 2008/0117820 A1   May 22, 2008

(30) Foreign Application Priority Data

Nov. 17, 2006  (JP)  ............... 2006-311975

(51) Int. Cl.
*G06F 11/00* (2006.01)
(52) U.S. Cl. .................. 370/234; 370/235; 370/252; 370/401
(58) Field of Classification Search .............. None
See application file for complete search history.

(56) References Cited

U.S. PATENT DOCUMENTS

| | | | | |
|---|---|---|---|---|
| 6,115,393 | A | * 9/2000 | Engel et al. | 370/469 |
| 2003/0117968 | A1 | * 6/2003 | Motegi et al. | 370/311 |
| 2005/0286416 | A1 | * 12/2005 | Shimonishi et al. | 370/229 |
| 2007/0121930 | A1 | * 5/2007 | Koga et al. | 379/413.03 |

FOREIGN PATENT DOCUMENTS

JP        200041039 A        2/2000

* cited by examiner

*Primary Examiner*—Chi H. Pham
*Assistant Examiner*—Shick Hom
(74) *Attorney, Agent, or Firm*—Westerman, Hattori, Daniels & Adrian, LLP (57) ABSTRACT

Communication quality values such as delay times of packets transmitted and received within a packet network are measured, and a threshold value is calculated based on the measured communication quality values. Further, a management reference value is calculated based on the communication quality values of packets whose measured communication quality values are within a range based on the threshold value. A communication state is detected by comparing the measured communication quality values with the management reference value.

12 Claims, 11 Drawing Sheets

| DETECTION DATE AND TIME | FIRST POINT ADDRESS | FIRST POINT PORT |
|---|---|---|
| 8/8 10:00:00.000 | 192.168.1.10 | 10000 |
| 8/8 10:00:01.000 | 192.168.1.11 | 10001 |
| .. | .. | .. |

| REMOTE ADDRESS | REMOTE PORT | SEQUENCE NUMBER | TRANSMISSION SIZE | RECEIVED SIZE | COMMUNICATION QUALITY VALUE (RTT) |
|---|---|---|---|---|---|
| 192.168.2.20 | 20000 | 10 | 1500 | 80 | 20 |
| 192.168.2.30 | 30000 | 30 | 200 | | |
| .. | .. | .. | .. | .. | .. |

FIG. 5

| PORT ID | THRESHOLD ~100 BYTE | ... | 1400~1500 BYTE |
|---|---|---|---|
| 2 | 10 | ... | 15 |
| 3 | 20 | ... | 30 |
| 4 | 40 | ... | 60 |
| .. | .. | ... | .. |

DETECTION METHOD, DETECTING DEVICE, REFERENCE VALUE CALCULATING DEVICE AND RECORDING MEDIUM

CROSS-REFERENCE TO RELATED APPLICATION

This non-provisional application claims priority under 35 U.S.C. §119(a) on Patent Application No. 2006-311975 filed in Japan on Nov. 17, 2006, the entire contents of which are hereby incorporated by reference.

BACKGROUND

1. Technical Field

The present invention relates to a detection method for detecting a communication state based on communication quality values measured for packets transmitted and received within a packet network, a detecting device adopting the detection method, a reference value calculating device related to the detection method, and a recording medium storing a computer program for realizing the detecting device. The present invention relates particularly to a detection method, a detecting device, a reference value calculating device and a recording medium, which enable highly reliable detection of a communication state without being influenced by congestion that occurs temporarily.

2. Description of Related Art

Communication systems such as IP phones using packet networks including a VoIP (Voice over IP) network have become popular. In order to manage the communication quality over packet networks such as a VoIP network, there is a method for detecting a communication state and monitoring a packet network by measuring communication quality values such as delay times of packets transmitted and received within the packet network and comparing the measured communication quality values with a management reference value preset by a network manager.

In addition, Japanese Patent Application Laid-Open No. 2000-41039 discloses a method for automatically calculating a management reference value from the average and standard deviation of values measured in the past. In the method disclosed in Japanese Patent Application Laid-Open No. 2000-41039, an average x and a standard deviation σ of the measured values are calculated, and the value of x+2σ that is a range including about 95% of the measured values is set as a management reference value. Then, by comparing values measured thereafter with the management reference value, a communication state is detected and the packet network is monitored.

SUMMARY

However, the method disclosed in Japanese Patent Application Laid-Open No. 2000-41039 is based on the premise that the distribution of measured values should be an ideal distribution like an exponential distribution and a normal distribution. Therefore, if the measured values to be used as the basis for calculation of a management reference value include abnormal values, there arises a problem that the calculated management reference value would be an inappropriate value with low reliability.

Figure 1A:
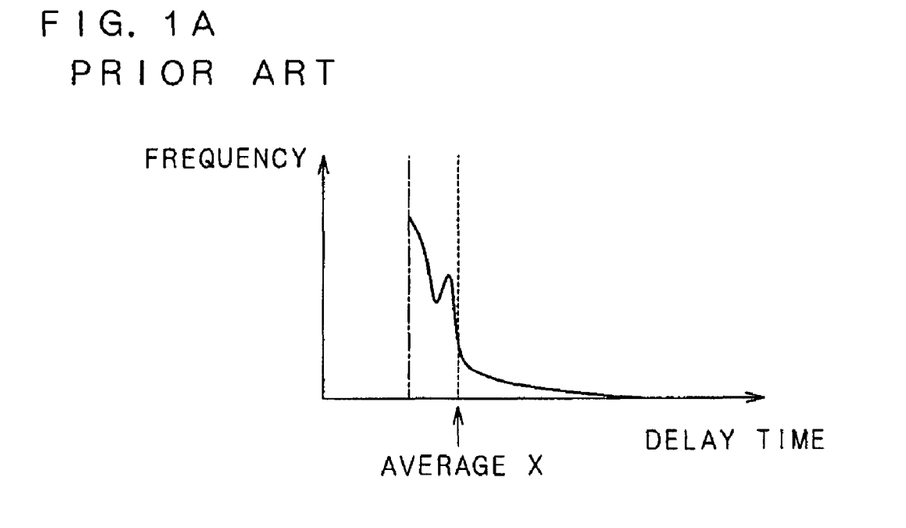
FIGS. 1A and 1B are graphs showing examples of the distribution of measured values.
Figure 1B:
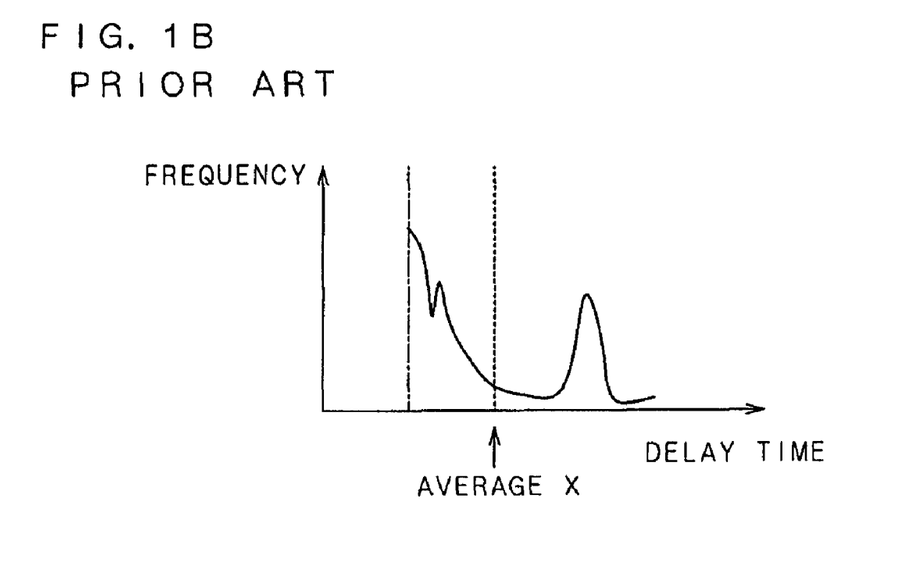

FIGS. 1A and 1B are graphs showing examples of the distribution of measured values. FIGS. 1A and 1B show the distribution of delay times by plotting the delay times on the horizontal axis and plotting the frequency on the vertical axis. In FIG. 1A, since the distribution is close to an exponential distribution, a management reference value calculated as x+2σ from the average value and standard deviation based on the distribution is a highly reliable appropriate as a value indicating a range of 95% of the distribution of measured values. FIG. 1B shows a distribution which largely differs from an ideal exponential distribution because instantaneous congestion occurred and a peak appeared in an abnormal position. In the case of such a distribution containing a lot of abnormal values, both of the average value and the standard dedication become larger, and the management reference value calculated as x+2σ would be an inappropriate value. If such a value is set as a management reference value, there is a possibility that a wrong determination may be made that the communication state is normal despite the fact that the communication state is abnormal.

In order to solve the above problems, it is an object to provide a detection method in which measured communication quality values are compared with a threshold value and a communication state is detected based on the communication quality values of packets within the threshold value, and thereby capable of setting a management reference value from the measured values excluding abnormal values, calculating a highly reliable appropriate management reference value and correctly managing the communication state, and to provide a detecting device adopting the detection method, a reference value calculating device related to the detection method, and a recording medium storing a computer program for realizing the detecting device.

A detection method according to a first aspect is a detection method for detecting a communication state based on communication quality values measured for packets transmitted and received within a packet network, and characterized by comprising the steps of: comparing the measured communication quality values with a preset threshold value; calculating a reference value based on the communication quality values of packets whose communication quality values are within a range based on the threshold value; and detecting a communication state based on the calculated reference value and measured communication quality values.

A detecting device according to a second aspect is a detecting device for detecting a communication state based on communication quality values measured for packets transmitted and received within a packet network, and characterized by comprising means for comparing the measured communication quality values with a preset threshold value; means for calculating a reference value based on the communication quality values of packets whose communication quality values are within a range based on the threshold value; and means for detecting a communication state based on the calculated reference value and communication quality values measured after the calculation.

A detecting device according to a third aspect is based on the second aspect, and characterized in that the communication quality values are delay times relating to transmission and reception of packets, and the detecting device further comprises: means for adding up the delay times of a plurality of packets for each packet size; means for calculating a delay time depending on packet size, based on a minimum value of delay times of each packet size; and means for calculating a threshold value to be set, based on the minimum value of delay times of each packet size, the delay time depending on packet size, and an allowable residence delay time depending on an allowable value preset for usage of the packet network.

A reference value calculating device according to a fourth aspect is a reference value calculating device for calculating a reference value relating to delay times measured for packets transmitted and received within a packet network, and characterized by comprising: means for adding up the measured delay times of a plurality of packets for each packet size; means for calculating a delay time depending on packet size, based on a minimum value of delay times of each packet size; and means for calculating a reference value relating to delay times, based on the minimum value of delay times of each packet size, the delay time depending on packet size, and an allowable residence delay time depending on an allowable value preset for usage of the packet network.

A recording medium storing a computer program according to a fifth aspect is a recording medium storing a computer program for causing a computer, which acquires communication quality values measured for packets transmitted and received within a packet network, to detect a communication state based on the communication quality values, and characterized by executing a step of causing the computer to compare the measured communication quality values with a preset threshold value; and a step of causing the computer to calculate a reference value for detecting a communication state by comparison with communication quality values measured thereafter, based on the communication quality values of packets whose communication quality values are within a range based on the threshold value.

In the first, second and fifth aspects, a communication state is detected based on a reference value calculated from communication quality values within a range based on a threshold value by regarding packets with communication quality values exceeding the threshold value as abnormal values and excluding these packets, and thus it is possible to manage the communication quality based on the reference value calculated from the communication quality values excluding abnormal values. Hence, it is possible to set a highly reliable appropriate reference value and it is possible to properly manage the communication state.

In the third aspect, by calculating the transmission delay time depending on communication distance and the serializing delay time depending on packet size based on the minimum value of delay times of each packet and further setting an allowable usage value for a queueing delay time depending on the usage of the packet network, such as the traffic condition of the communication network, and calculating a threshold value based on the transmission delay time, the serializing delay time and the allowable residence delay time showing an allowable queueing delay time, it is possible to calculate an optimum threshold value by considering various factors such as the packet size and communication environment.

In the fourth aspect, by calculating the transmission delay time depending on communication distance and the serializing delay time depending on packet size based on the minimum value of delay times of each packet and further setting an allowable usage value for the queueing delay time depending on the usage of the packet network, such as the traffic condition of the communication network, and calculating a reference value based on the transmission delay time, the serializing delay time and the allowable residence delay time showing an allowable queueing delay time, it is possible to calculate an optimum reference value capable of being used for monitoring on-line communication quality conditions, for example.

In the detection method, the detecting device and the recording medium storing the computer program according to the first, second and fifth aspects, communication quality values measured for packets transmitted and received within a packet network are compared with a preset threshold value, a reference value is calculated based on the communication quality values of packets whose communication quality values are within a range based on the threshold value, and a communication state is detected based on the calculated reference value and communication quality values measured after the calculation.

In this structure, since packets with communication quality values exceeding the threshold value are regarded as abnormal values and excluded and a communication state is detected based on communication quality values within the threshold value, it is possible to calculate a reference value from the communication quality values excluding abnormal values, and it is possible to manage the communication quality based on the calculated reference value. Hence, the present invention has advantageous effects, such as making it possible to set a highly reliable appropriate reference value and properly manage the communication state.

In the detecting device according to the third aspect, the delay times of a plurality of packets measured as communication quality values are added up for each packet size, and the sum of the transmission delay time depending on communication distance and a delay time such as the serializing delay depending on packet size and communication band and relating to the transmission of packets by a device relaying packets on a communication channel is calculated based on the minimum value of delay times of each packet size. Then, the transmission delay time and serializing delay time depending on packet size are calculated by simultaneous equations based on the relationship between the minimum values of delay times of each packet size. Moreover, an allowable time as a residence delay time in which packets reside as a queue in the relay device on the channel is preset as an allowable residence delay time depending on an allowable value for usage. Further, a threshold value to be set is calculated based on the transmission delay time, the serializing delay time and the allowable residence delay time.

This structure has advantageous effects, such as making it possible to calculate an optimum threshold value by considering various factors such as the packet size and communication environment.

In the reference value calculating device according to the fourth aspect, the delay times of a plurality of packets measured as communication quality values are added up for each packet size, and the sum of the transmission delay time depending on communication distance and a delay time such as the serializing delay depending on packet size and communication band and relating to the transmission of packets by a device relaying the packets on a communication channel is calculated based on the minimum value of delay times for each packet size. Then, the transmission delay time and the serializing delay time depending on packet size are calculated by simultaneous equations based on the relationship between the minimum values of delay times of each packet size. Moreover, an allowable time as a residence delay time in which packets reside as a queue in the relay device on the channels is preset as an allowable residence delay time depending on an allowable value for usage. Further, a reference value to be set is calculated based on the transmission delay time, the serializing delay time and the allowable residence delay time.

This structure has advantageous effects, such as making it possible to calculate an optimum reference value capable of being used for monitoring on-line communication quality conditions, for example, by considering various factors such as the packet size and communication environment.

The above and further objects and features will more fully be apparent from the following detailed description with accompanying drawings.

DETAILED DESCRIPTION

The following will explain an embodiment in detail based on the drawings.

Figure 2:
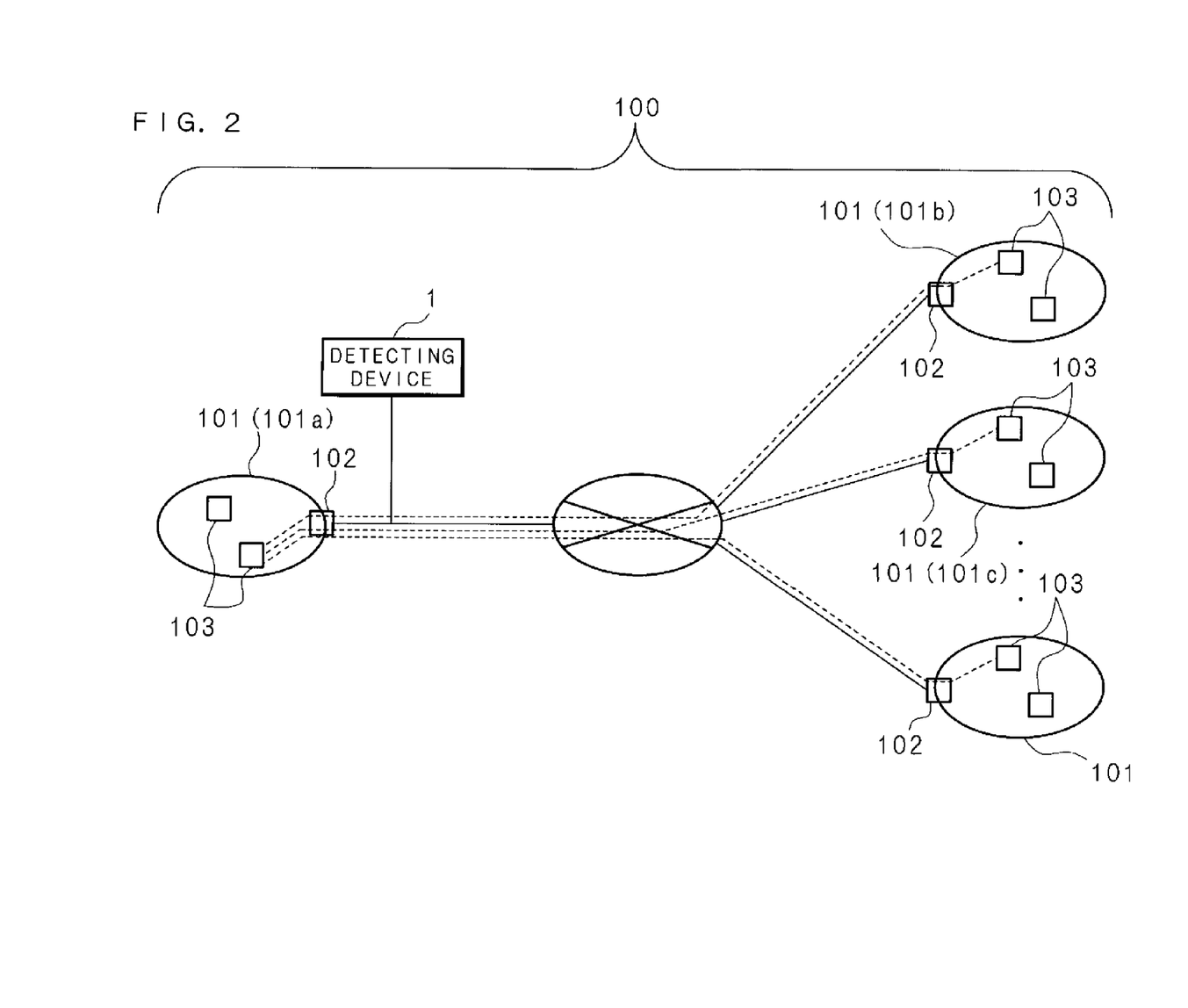
FIG. 2 is an explanatory view conceptually showing an example of the detection method.

FIG. 2 is an explanatory view conceptually showing an example of the detection method. In FIG. 2, 100 is a packet network such as a WAN, a VoIP (Voice over IP) network, and the Internet. A plurality of points 101, 101, . . . classified as segments are connected through the packet network 100. In each of the points 101, 101, . . . , a connection device 102 such as a router and a gateway is provided, and one or a plurality of communication devices 103, 103, . . . , such as various types of computers, are connected through the connection device 102. In the following explanation, the points 101, 101, . . . are expressed as the first point 101a, second point 101b, third point 101c, . . . if particularly necessary.

Communication channels are set between the first point 101a and the second point 10b, third point 101c, . . . , respectively, and various kinds of data are transmitted and received in packet form through the set communication channels. Moreover, provided on the communication channels connecting the first point 101a and the second point 101b, third point 10c, . . . is a detecting device 1 for detecting (capturing) packets transmitted and received through the communication channels. The detecting device 1 measures communication quality values based on the detected packets, and detects a communication state in the packet network 100 and the respective communication channels based on the measured communication quality values. Additionally, the detecting device 1 calculates a reference value required for detecting a communication state based on the detected packets.

Figure 3:
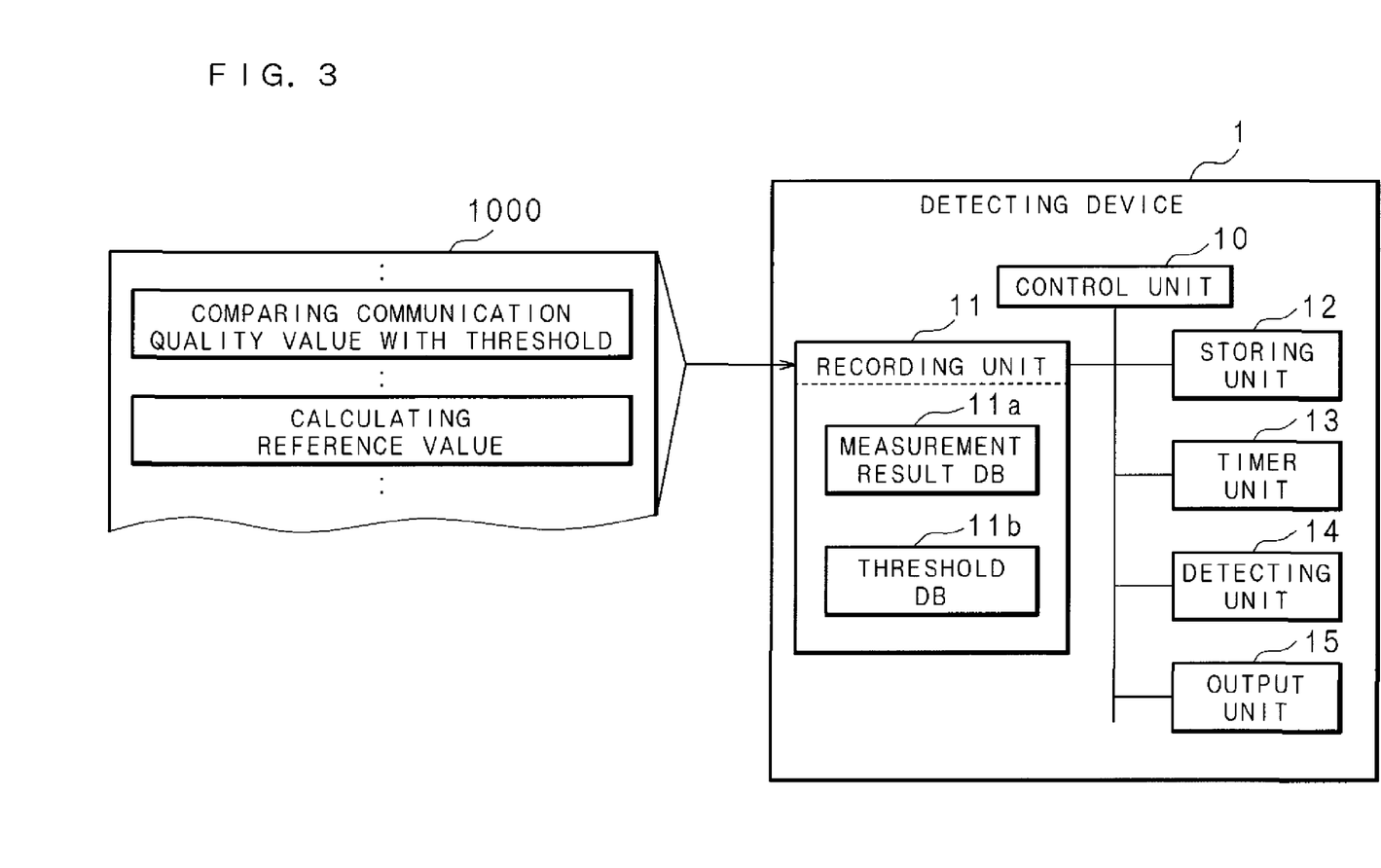
FIG. 3 is a block diagram showing a structural example of a detecting device.

FIG. 3 is a block diagram showing a structural example of the detecting device 1. The detecting device 1 comprises control unit 10 (comparing unit, detecting unit, adding unit, first calculating unit, second calculating unit, third calculating unit, fourth calculating unit, fifth calculating unit, sixth calculating unit) such as a CPU for controlling the entire device; recording unit 11 such as a hard disk for recording various kinds of information including a computer program 1000 and data; storing unit 12 such as a RAM for temporarily storing various kinds of information; timer unit 13 for operating as a clock and a timer; detecting unit 14 for detecting packets transmitted and received on the communication channels; and output unit 15 such as a monitor and a printer. By storing the computer program 1000 recorded on the recording unit 11 into the storing unit 12 and executing it under the control of the control unit 10, the computer program 1000 operates as the detecting device 1.

A part of the recording area of the recording unit 11 is used as various kinds of databases, such as a measurement result database (measurement result DB) 11a for recording measurement results of communication quality values based on the detected packets, and a threshold value database (threshold value DB) 11b for recording a threshold value set as a reference value.

Figure 4:
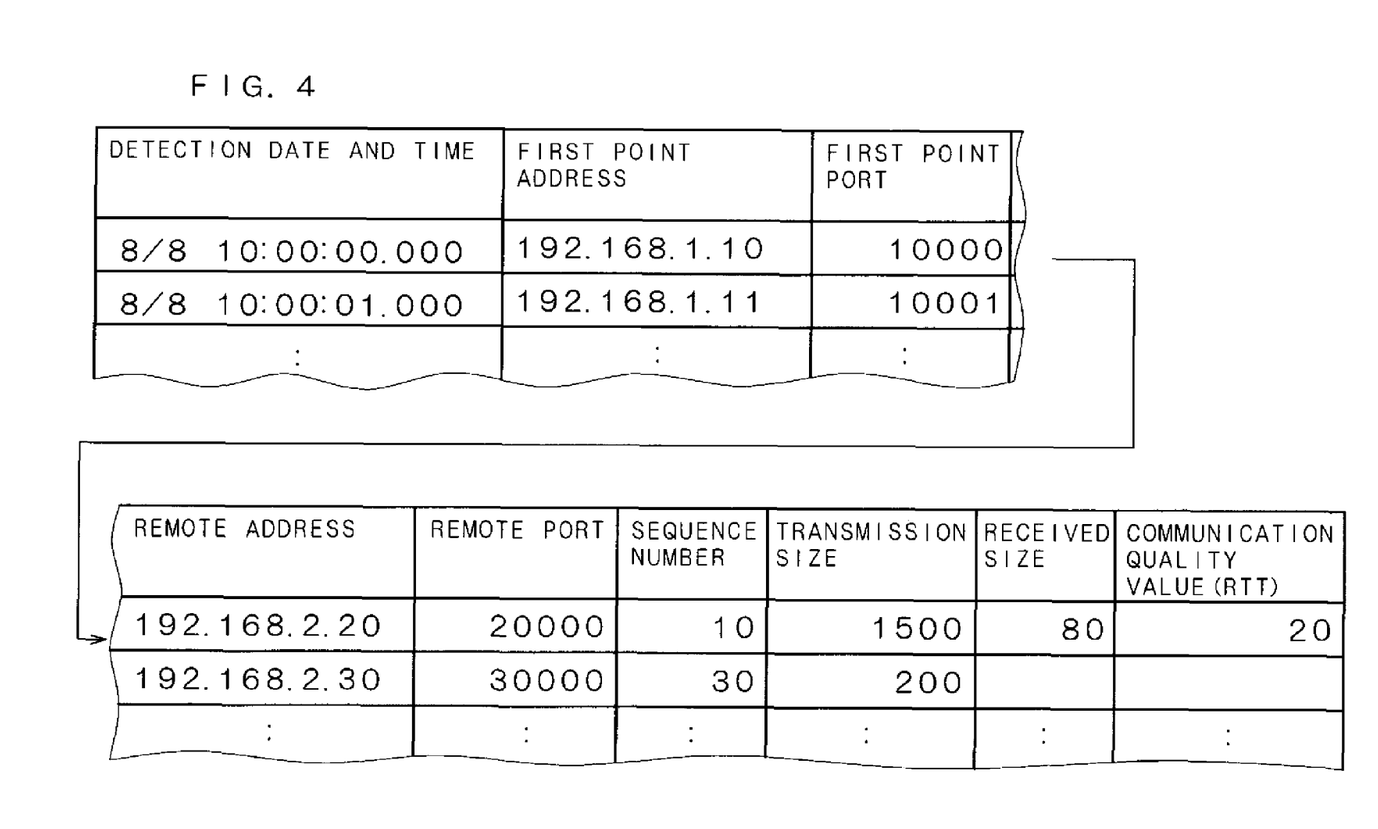
FIG. 4 is an explanatory view conceptually showing an example of the recorded contents in a measurement result database included in the detecting device.

FIG. 4 is an explanatory view conceptually showing an example of the recorded contents in the measurement result database 11a included in the detecting device 1. The measurement result database 11a is a database for recording various kinds of information about the received packets as records, and records various kinds of information such as the detection date and time, the address and port of the communication device 103 in the first point 101a as the source or the destination, a remote address and a remote port, the sequence number assigned to packets, the transmission size and received size of packets, and the communication quality value (ex. RTT: Round Trip Time).

The remote address is the address of the communication device 103 in other point 101 which communicates with the communication device 103 in the first point 101a. The remote port is a port of the address of the communication device 103 in other port 101 which communicates with the communication device 103 in the first point 101a. The sequence number is a number assigned to a packet and, for example, used to associate DATA transmitted from the first point 101a with ACK (acknowledgement) for the data. The transmission size is the size of packet transmitted from the first point 101a, and the received size is the size of packet received by the first point 101a. RTT is, for example, a time representing the difference between the transmitted time of DATA from the first point 101a and the received time of ACK corresponding to the DATA, and is used as data indicating a delay time that is one of communication quality values.

Figure 5:
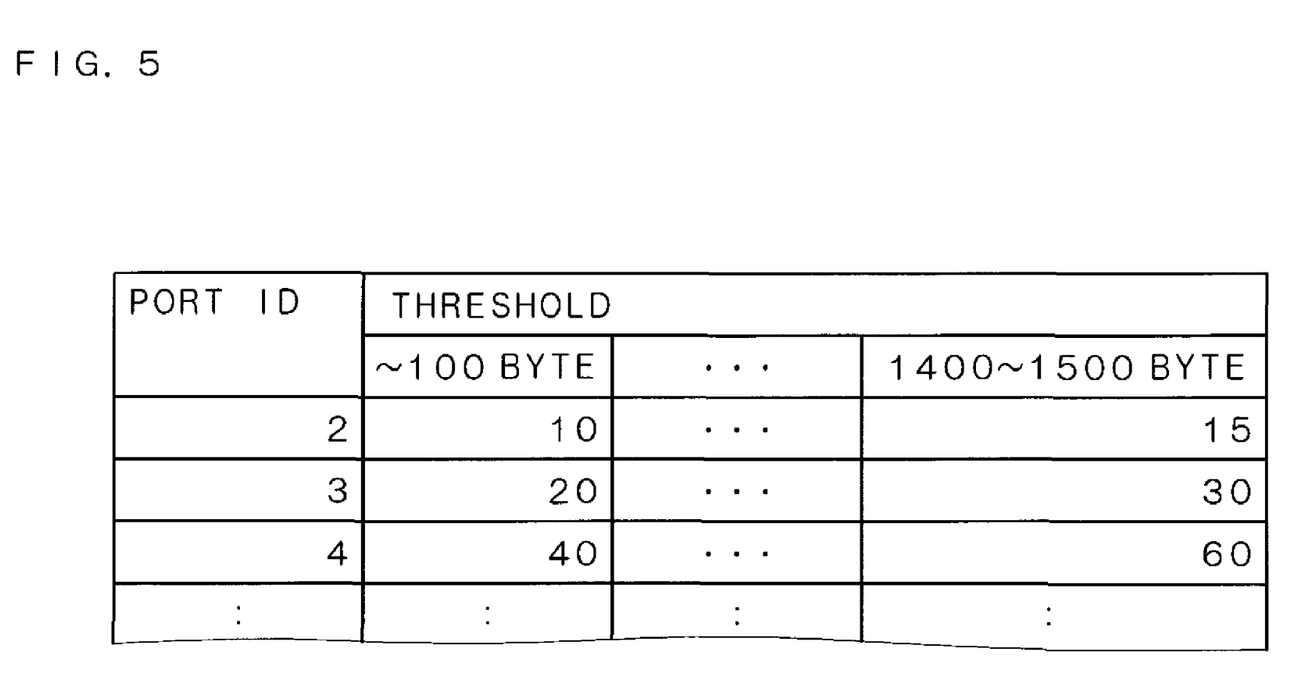
FIG. 5 is an explanatory view conceptually showing an example of the recorded contents in a threshold value database included in the detecting device.

FIG. 5 is an explanatory view conceptually showing an example of the recorded contents in the threshold value database 11b included in the detecting device 1. In the threshold value database 11b, data in msec indicating threshold values set for each point 101 and each packet size are recorded in association with the point ID identifying the point 101 and packet sizes. For example, a threshold value of 10 msec is set for packets with a packet length of less than 100 bytes which are transmitted and received to/from the communication device 103 in the second point 101b whose point ID is 2, and a threshold value of 30 msec is set for packets with a packet length of not less than 1400 bytes but less than 1500 bytes which are transmitted and received to/from the communication device 103 in the third point 101c whose point ID is 3.

Next, the following will explain the communication quality measured based on packets detected by the detecting device 1. The communication quality to be measured includes various items, such as the delay time indicated as a value of RTT, etc., the number of lost packets, and the loss rate. Here, the delay time indicated as RTT will be explained.

Figure 6:
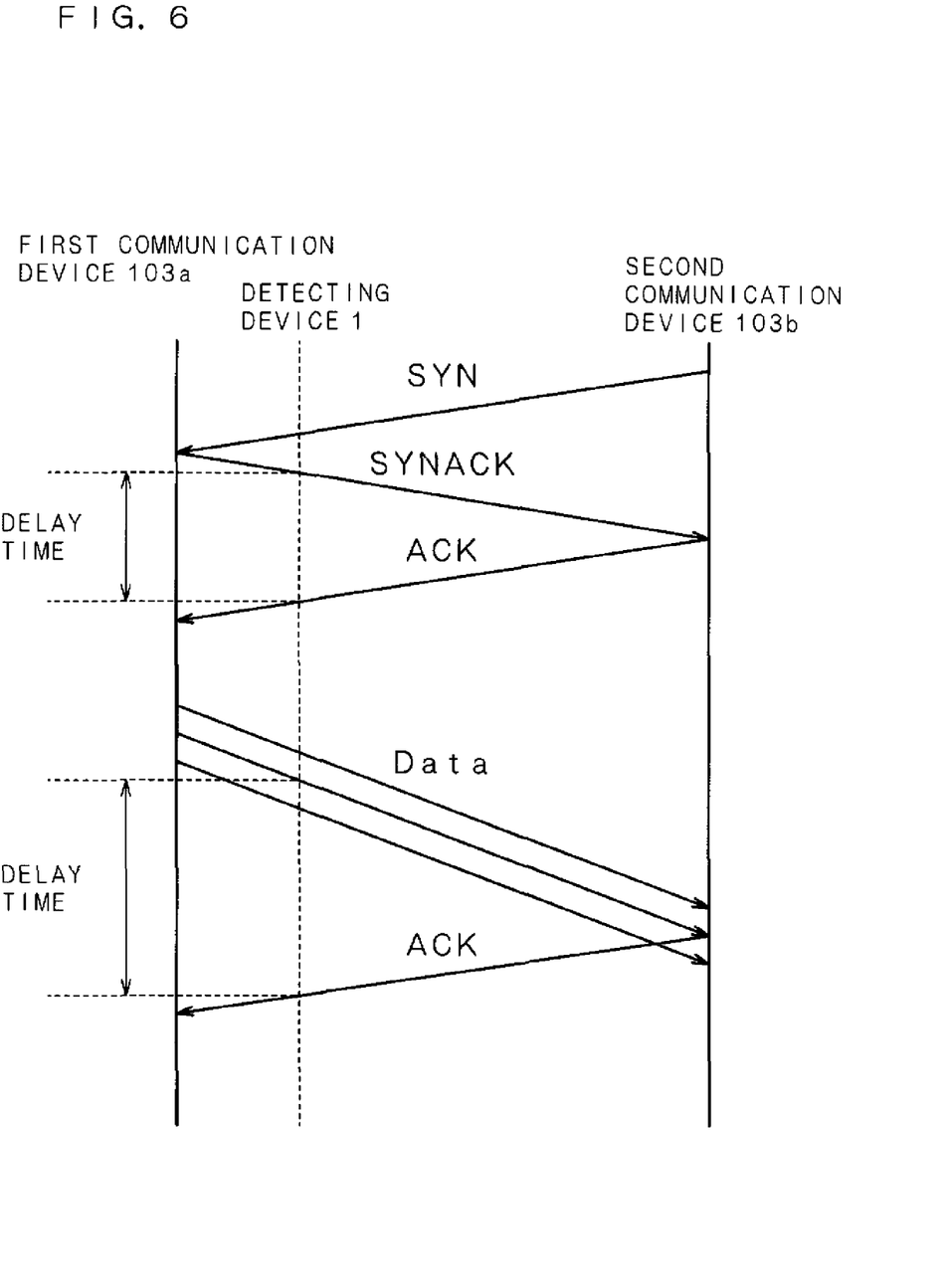
FIG. 6 is an explanatory view conceptually showing communication quality measurement performed by the detecting device.

FIG. 6 is an explanatory view conceptually showing communication quality measurement performed by the detecting device 1. In FIG. 6, the delay time to be measured as a communication quality value about a packet based on TCP (Transmission Control Protocol) is shown using the sequence view. In FIG. 6, a first communication device 103a is a device provided in the first point 101a, and a second communication device 103b is a device provided in the second point 101b. The detecting device 1 detects packets transmitted and received between the first communication device 103a and the second communication device 103b, and measures the delay time as a communication quality value.

FIG. 6 shows a state in which an SYN packet is transmitted from the second communication device 103b to the first communication device 103a, the first communication device 103a transmits an SYNACK packet to the second communication device 103b for the received SYN packet, and the second communication device 103b transmits an ACK packet for the received SYNACK packet. The detecting device 1 detects (captures) the SYNACK packet transmitted from the first communication device 103a to the second communication device 103b and the ACK packet transmitted from the second communication device 103b to the first communication device 103a, and measures the difference between the detected times as the delay time (RTT). Note that it is possible to detect data such as the addresses of the points 101 and the received size from the detected packets, and the detecting device 1 records these data and delay time in association with each other in the measurement result database 11a.

The detecting device 1 recognizes the relationship between the SYNACK packet and the ACK packet based on the sequence numbers assigned to the packets, and recognizes the points 103 based on the addresses indicated as the source or destination in the packets. For example, when the address is "192.168.2.xxx" (xxx is an integer between 0 and 255), it is recognized as a device in the second point 101b. When the address is "192.168.3.xxx", it is recognized as a device in the third point 10c. When the address is "192.168.4.xxx", it is recognized as a device in the fourth point 101d.

Further, FIG. 6 shows a state in which a DATA packet is transmitted from the first communication device 103a to the second communication device 103b, and the second communication device 103b transmits an ACK packet for the received DATA packet. The detecting device 1 detects the DATA packet transmitted from the first communication device 103a to the second communication device 103b and the ACK packet transmitted from the second communication device 103b to the first communication device 103a, and measures the difference between the detected times as the delay time. Note that the detecting device 1 recognizes the relationship between the DATA packet and the ACK packet based on the sequence number assigned to the packets.

The SYNACK packet is a short packet of less than 100 bytes, and the DATA packet may have a packet size equal to or larger than 1400 bytes. The detecting device 1 can measure the delay time for each point and packet size by performing such measurement on packets of various packet sizes and the communication devices 103 provided in various points. Although FIG. 6 shows a mode in which an increase in traffic at the time of measurement is limited by measuring the communication quality values by passive measurement for detecting packets transmitted and received between the first communication device 103a and the second communication device 103b, it may be possible to carry out a mode adopting active measurement in which the detecting device 1 transmits communication confirmation packets such as PING packets to the devices provided in the respective points 101, 101, and the communication quality values are measured based on packets returned in response to the communication confirmation packets.

Figure 7:
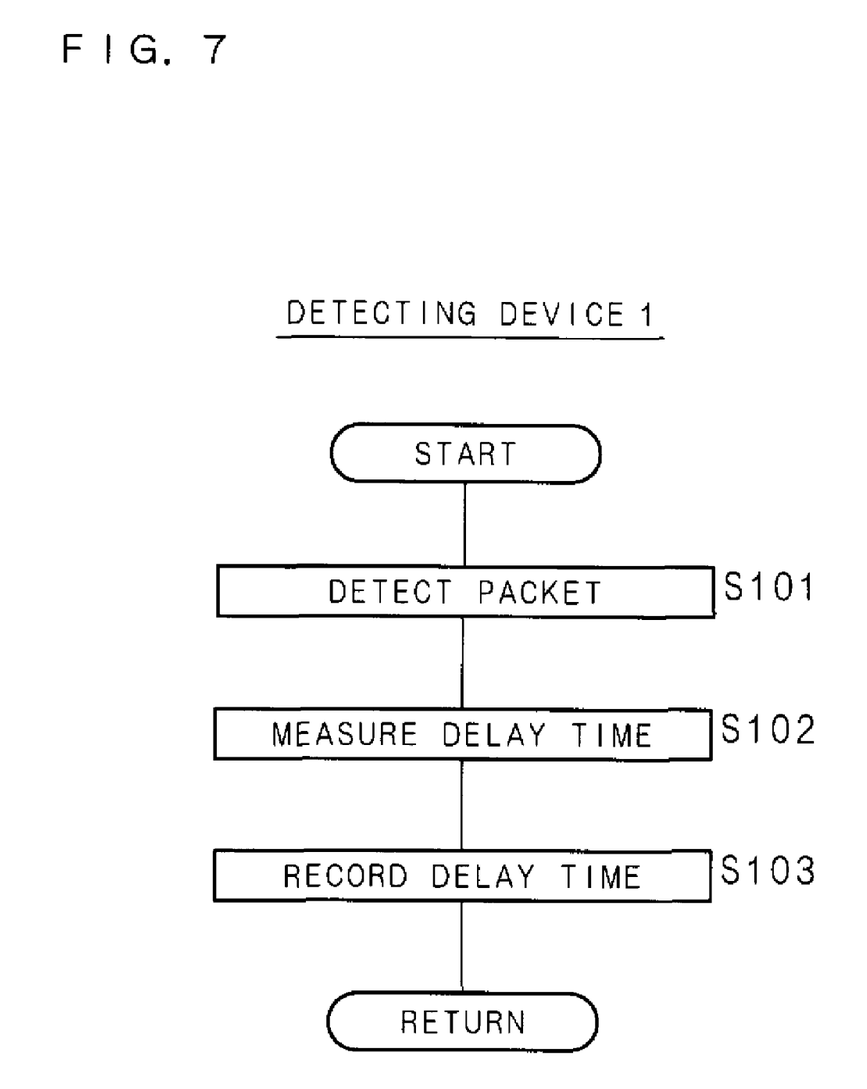
FIG. 7 is a flowchart showing an example of a measurement process performed by the detecting device.

Next, the following will explain various kinds of processes performed by the detecting device 1. FIG. 7 is a flowchart showing an example of a measurement process performed by the detecting device 1. The measurement process is a process in which the detecting device 1 detects packets transmitted and received on the communication channels and measures and records the communication quality values. Under the control of the control unit 10 executing the computer program 1000, the detecting device 1 detects packets transmitted and received between the first point 101a and other points 101, 101, . . . by the detecting unit 14 (S101), measures the communication quality values such as the delay times for the detected packets (S102), and records the measured communication quality values in the measurement result database 11a (S803). The measurement process is executed in this manner.

Figure 8:
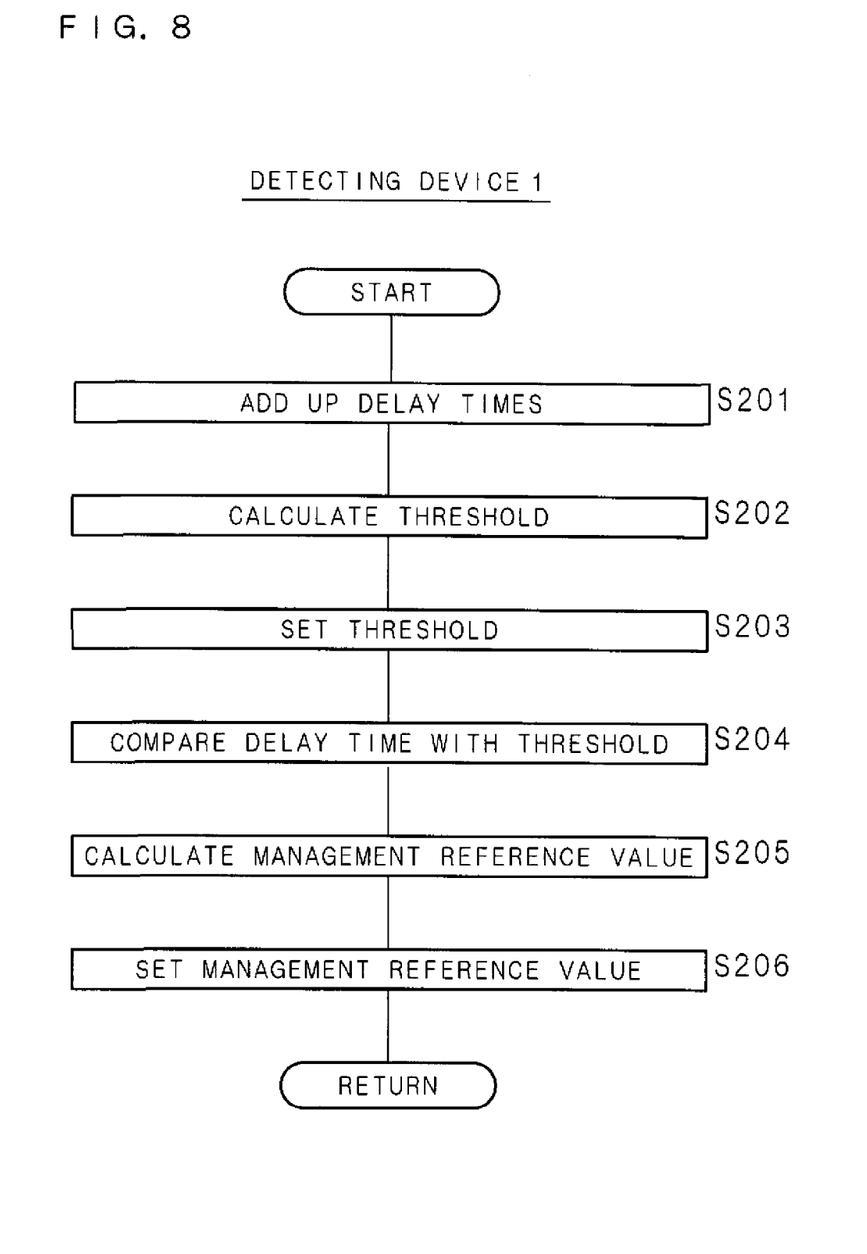
FIG. 8 is a flowchart showing an example of a reference value calculation process performed by the detecting device.

FIG. 8 is a flowchart showing an example of a reference value calculation process performed by the detecting device 1. The reference value calculation process includes the process of calculating a management reference value which is used as a criterion for detecting a communication state, the process of selecting a communication quality value which is the basis for calculating a management reference value, and the process of calculating a threshold value for selecting a communication quality value. Note that the reference value calculation process is a process performed at predetermined time intervals of, for example, 24 hours, and a threshold value and a management reference value are calculated based on the communication quality values measured in 24 hours, for example. The threshold value and the management reference value calculated are updated every time the reference value calculation process is executed.

Under the control of the control unit 10 executing the computer program 1000, the detecting device 1 adds up the communication quality values, here the delay times, corresponding to the duration of reference value calculation recorded in the measurement result database ha, for each packet size and each of the points 101, 101, . . . (S201), calculates a threshold value for each packet size and each of the points 101, 101, . . . based on the added results (S202), and sets the calculated threshold values as the threshold values for each packet size and each of the points 101, 101, . . . for selecting a communication quality value (S203). The detail of the threshold value calculation process in step S202 will be explained later.

Further, under the control of the control unit 10, the detecting device 1 compares the communication quality values added for each packet size and each of the points 101, 101, . . . with the respective set threshold values (S204), selects packets whose communication quality values are within a range based on the threshold value and calculates a management reference value based on the average and standard deviation of the communication quality values of the selected packets within the threshold value (S205), sets the management reference values calculated for each packet size and each of the points 101, 101, . . . as criteria for detecting a communication state (S206). In step S205, for example, if the average of the communication quality values is x and the standard deviation of the communication quality values is σ, then the value given by x+2σ is set as a management reference value. Suppose that the distribution of communication quality values follows the exponential distribution, this value includes about 95% of the communication quality values. It may also be possible to calculate the value of x+3σ including 99.7% of the communication quality values. The management reference value thus calculated is calculated based on the communication quality values included in the population after selection by removal of values exceeding the threshold value, which are abnormal values, from the communication quality values as the original population. By selecting communication quality values within a range based on the threshold value, the population after selection is supposed to be closer to the ideal exponential distribution, and therefore the reliability of the management reference value is improved.

Here, the threshold value calculation process in step S202 will be explained. The delay time measured as a communication quality value may be indicated as the sum of the transmission delay time depending on communication distance, the serializing delay time relating to a relay of packets by a device for relaying the packets on the communication channel, and the residence delay time (queueing delay time) in which packets reside as a queue in the devices on the communication channel. The transmission delay time depending on communication distance takes a fixed value for each of the points 101, 101, . . . . The serializing delay time is the time required for the relay device to transmit packets and is the quotient given by dividing the packet size by a transmission processing rate, and thus it is proportional to packet size and takes a fixed value for each packet size. The residence delay time is a delay time varying according to the communication state, that is, the traffic amount, in the packet network 100. Here, the residence delay time that is allowed is denoted as the allowable residence delay time.

If the delay time exceeds the allowable limit when the communication state is abnormal such as a congested state, by using an allowable delay time as a threshold value, the communication quality values which are abnormal due to the abnormal communication state can be excluded from the population that is the basis for calculating a management reference value. Thus, the threshold value is calculated as the sum of the transmission delay time, serializing delay time and allowable residence delay time as shown by Equation 1 below.

$$\text{Threshold value}=D+R+Qp \qquad \text{Equation 1,}$$

where D is the transmission delay time,
R is the serializing delay time, and
Qp is the allowable residence delay time.

Since the serializing delay time is proportional to the packet size, if the proportional constant is denoted as a coefficient k relating to packet size, then Equation 1 may be modified into Equation 2 shown below.

$$\text{Threshold value}=D+k\cdot S+Qp \qquad \text{Equation 2,}$$

where k is the coefficient relating to packet size, and
S is the packet size.

Moreover, if the delay times are added up for each packet size and each of the points 101, 101, . . . , then the transmission delay time and the serializing delay time take almost fixed values, and therefore the variation in the delay time is equivalent to the residence delay time. Thus, the minimum value of the delay times added for each packet size and each of the points 101, 101, . . . is equal to the sum of the transmission delay time and the serializing delay time of each packet size and each of the points 101, 101. Accordingly, for one point 101, Equation 3 shown below is established for each packet size.

$$\text{Minimum value of delay times of packet size } S1 = D+k\cdot S1 \qquad \text{Equation 3.}$$

$$\text{Minimum value of delay times of packet size } S2 = D+k\cdot S2 \qquad \text{Equation 3.}$$

$$\text{Minimum value of delay times of packet size } Sn = D+k\cdot Sn \qquad \text{Equation 3.}$$

By solving a plurality of Equations 3 about each of packet sizes as simultaneous equations, it is possible to calculate the transmission delay time D and coefficient k for one point 101. By performing similar calculations for each of the points 101, 101, . . . , it is possible to calculate the transmission delay time D for each of the points 101, 101, . . . .

In the case of TCP, as a plurality of packet sizes, it may be possible to use the packet sizes of small-size packets such as an SYNACK packet for an SYN packet and an ACK packet for an SYNACK packet, and the packet sizes of large-size packets such as an ACK packet for a DATA packet of largest packet size. It is possible to measure a large number of these packets because they are transmitted and received frequently. For example, since all the SYN packet and the SYNACK packet, and the SYNACK and the ACK packet have a packet size of about 60 bytes, S1=60. Since the DATA packet of largest size has a packet size of about 1500 bytes and the ACK packet has a packet size of about 60 bytes, if they are averaged, S2=780. It is possible to calculate the transmission delay time D and coefficient k by solving the simultaneous equations by using S1, S2 and the respective delay times.

The allowable residence delay time Qp is calculated using a queueing theory. When M/M/1 model is used as a queueing model, the residence delay time of the device relaying packets constituting the packet network 100 can be expressed by Equation 4 shown below. Note that it may be possible to use other queueing model such as M/D/1 according to the conditions of the device for relaying packets.

$$Q=P\cdot\rho/(1-\rho) \qquad \text{Equation 4,}$$

where Q is the residence delay time,
P is the packet processing time, and
ρ is the usage of packet network 100.

Since the packet processing time P in Equation 4 is equivalent to the serializing delay time, it can be calculated as the product of coefficient k and packet size S. As the packet size S, 1514 bytes as the maximum size of packet may be set by considering the worst case of packet processing time, or a value such as the average value of flowing packet sizes may be set. By presetting an allowable value ρp for the usage of the packet network 100 such that ρp=0.6, for example, based on the conditions such as the application of the packet network 100, the allowable residence delay time Qp can be calculated by Equation 5 shown below.

$$Qp=k\cdot S\cdot\rho p/(1-\rho p) \qquad \text{Equation 5}$$

Then, by substituting the transmission delay time D and the product of coefficient k, packet size S and allowable residence delay time Qp into Equation 2, it is possible to calculate a threshold value. By determining a transmission delay time D to be substituted, according to the points 101, 101, . . . , and determining a packet size S to be substituted for each packet size, it is possible to calculate a threshold value for each packet size and each of the points 101, 101, . . . .

Figure 9:
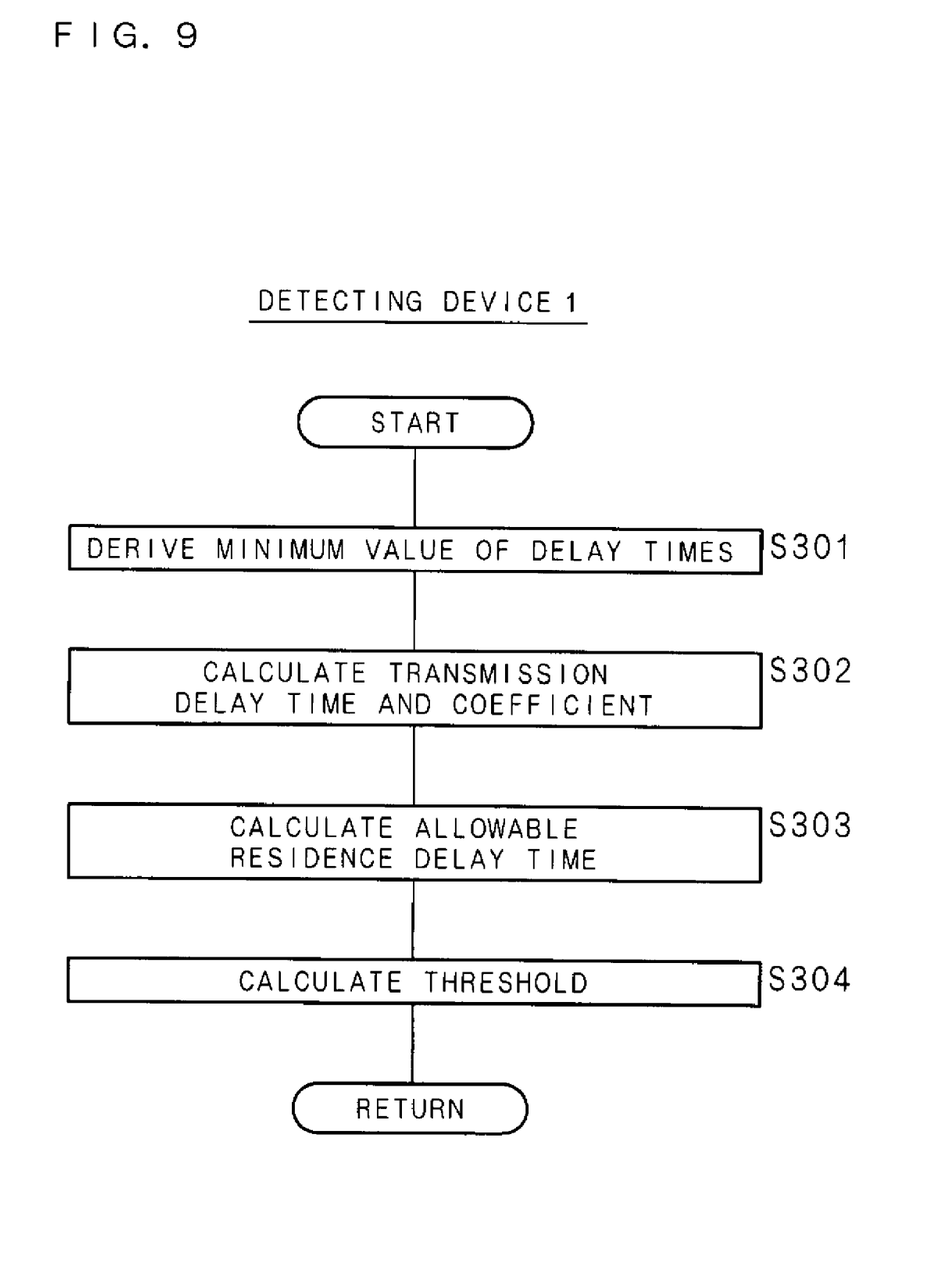
FIG. 9 is a flowchart showing an example of a threshold value calculation process performed by the detecting device.

FIG. 9 is a flowchart showing an example of a threshold value calculation process performed by the detecting device 1. The threshold value calculation process explained here is the threshold value calculation process executed in step S202 of the reference value calculation process, and is a process adopting the above-described threshold value calculation method. Under the control of the control unit 10 executing the computer program 1000, the detecting device 1 derives the minimum value of delay times representing communication quality values for each packet size (S301), and calculates a transmission delay time for a point 101 subjected to calculation and the coefficient relating to packet size, based on the minimum value of delay times of each packet size (S302). The calculation of the transmission delay time and coefficient in step S302 can be performed by solving the simultaneous equations shown by Equation 3 above.

Then, under the control of the control unit 10, the detecting device 1 calculates allowable residence delay times corresponding to packet sizes, respectively, based on the allowable value for the usage of packet network 100 recorded as the set value in advance in the recording unit 11, the coefficient calculated in step S302 and the packet size (S303). The calculation of the allowable residence delay times in step S303 is performed based on Equation 5 shown above.

Under the control of the control unit 103 the detecting device 1 calculates a threshold value as the sum of the transmission delay time calculated in step S302, the product of the coefficient and packet size calculated in step S302, and the allowable residence delay time (S304). The calculation of the threshold value in step S304 is performed based on Equation 2 shown above. By executing the calculation of steps S301 to S304 for each packet size and each of the points 101, 101, . . . , a threshold value is calculated for each packet size and each of the points 101, 101, . . . .

Figure 10:
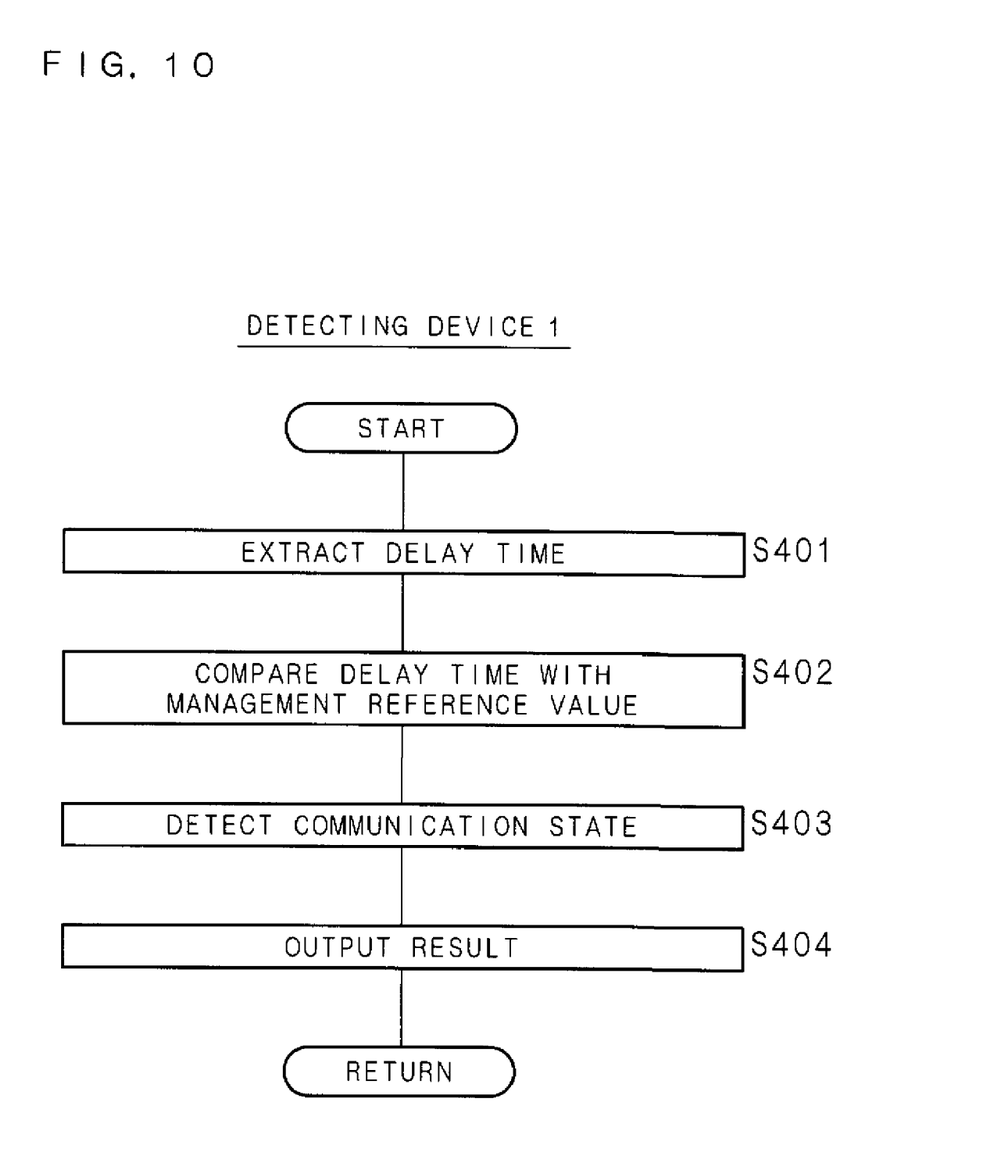
FIG. 10 is a flowchart showing an example of a communication state detection process performed by the detecting device.

FIG. 10 is a flowchart showing an example of a communication state detection process performed by the detecting device 1. The reference value is calculated and updated at intervals of 24 hours, for example, by the above-described reference value calculation process, and the communication state detection process for detecting a communication state of the packet network 100 is executed based on the updated reference value at predetermined intervals of, for example, one minute. Under the control of the control unit 10 executing the computer program 1000, the detecting device 1 extracts communication quality values, here delay times, in the detection time of, for example, one minute recorded in the measurement result database 11a (S401), compares the extracted delay times with the management reference value calculated by the reference value calculation process (S402), detects a communication state based on the comparison results (S403), and outputs the detected results from the output unit (S404). The processes of steps S401 to S404 are executed for each packet size and each of the points 101, 101, . . . . As the comparison in step S402, it may be possible to calculate the average value of communication quality values and compare the calculated average value with the management reference value, instead of comparing the communication quality value as it is with the management reference value. The detection of communication state in step S403 means the detection of a communication state such as a normal state and a congested state, based on the frequency of occurrence of abnormality by regarding a delay time exceeding the range of the management reference value as an abnormal value. The communication state detection process is executed every unit time of, for example, one minute, based on the communication quality values for unit time. Note that it may be possible to compare a communication equality value with the management reference value whenever a communication quality value is measured and output the state when the communication quality value exceeds the range based on the management reference value, instead of executing the communication state detection process for the communication quality values recorded in the measurement result database 11a.

Figure 11:
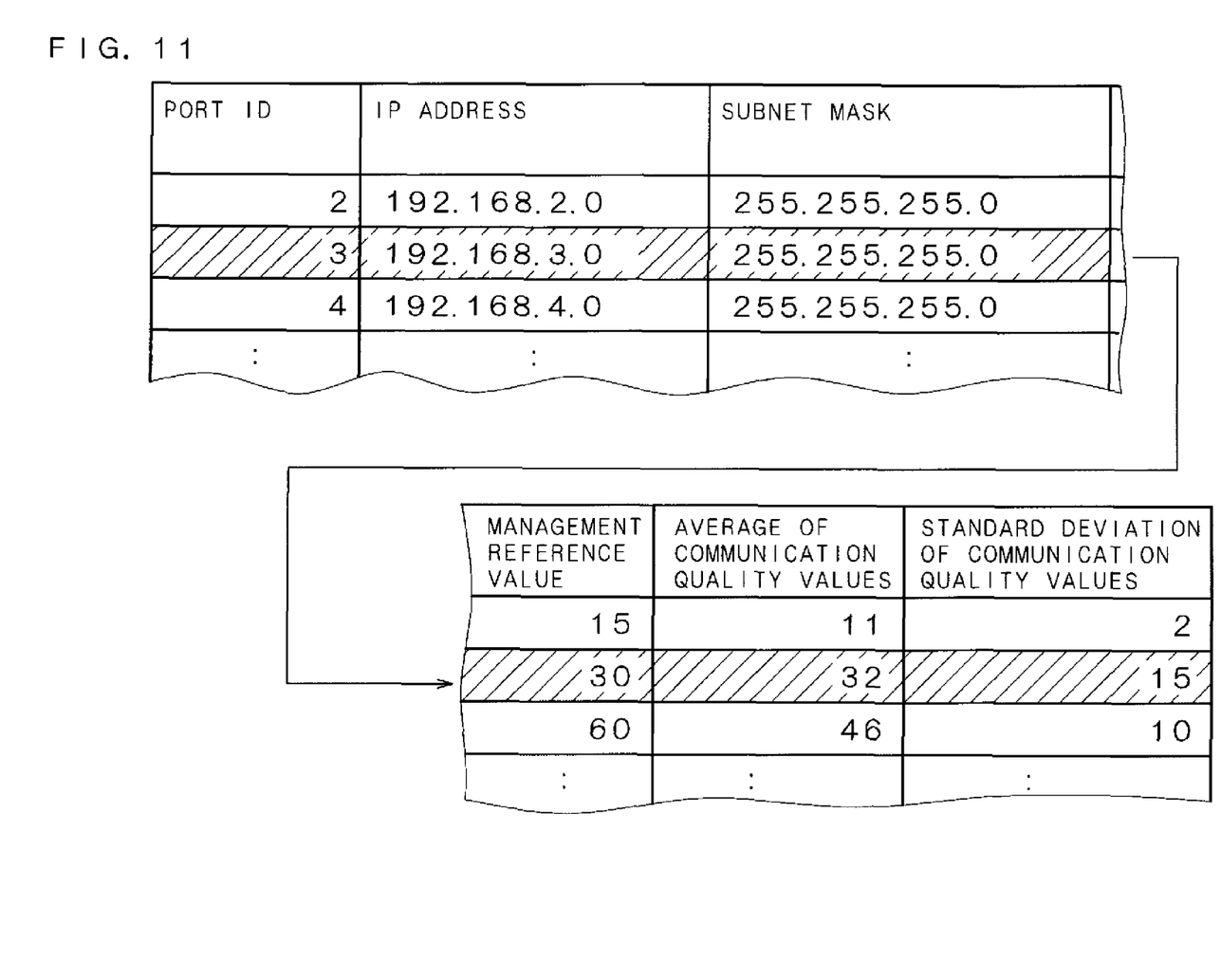
FIG. 11 is an explanatory view showing an example of detection results of communication state outputted from output unit of the detecting device.

FIG. 11 is an explanatory view showing an example of detection results of communication state outputted from the output unit 15 of the detecting device 1. The detection results shown in FIG. 11 indicate the communication state as a table, and show the IP address and subnet mask of the connection device 102 at the point 101, the management reference value for the communication quality values, the average value of the measured communication quality values, and the standard deviation of the measured communication quality values for each of the points 101, 101, . . . . The communication quality value shown in FIG. 11 is the delay time of packet with a packet size of 1500 bytes. As the management reference value, a value representing the upper limit of delay time is indicated. As shown in FIG. 11, the display method is changed for all data about a point 101 including data indicating that the average value of measured communication quality values exceeds a range based on the management reference value, here all data about the third point 101c whose point ID is indicated as 3. It is indicated that abnormality occurs in the communication state relating to the third point 101c.

Although the above-described embodiment illustrates a mode in which the measurement of communication quality values and the calculation of a reference value are executed by one detecting device, it is not limited to this and may be developed into various modes, for example, a mode in which it may be possible to execute the measurement and calculation by a plurality of devices, namely a reference value calculating device for calculating a reference value and a detecting device for detecting a communication state based on the reference value calculated by the reference value calculating device.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A detection method for detecting a communication state, said method comprising:
    setting a threshold value based on measured communication quality values regarding data transmitted in a packet network;
    extracting communication quality values from among measured communication quality values using the threshold value;
    calculating, by a computer, a reference value using the extracted communication quality values; and
    applying the reference value to detection of a communication state of the packet network.

2. The detecting method according to claim 1, wherein the communication quality values are delay times relating to transmission and reception of packets, further comprising the step of:
    adding up the delay times of a plurality of packets for each packet size;
    calculating a delay time depending on packet size, based on a minimum value of delay times of each packet size; and
    calculating a threshold value to be set, based on the minimum value of delay times of each packet size, the delay time depending on packet size, and an allowable residence delay time depending on an allowable value preset for usage of the packet network.

3. The detecting method according to claim 2, further comprising the step of:
calculating a transmission delay time and a coefficient by using Equation (A) for each packet size, based on a relationship among a minimum value of delay times, a transmission delay time depending on communication distance, a packet size, and a coefficient relating to the packet size;
calculating an allowable residence delay time by using Equation (B) based on the preset allowable value for usage of the packet network and the product of the coefficient and packet size; and
calculating a threshold value as the sum of the transmission delay time, the product of the coefficient and packet size, and the allowable residence delay time by using Equation (C), $$\text{minimum value of delay times of packet size } S = D + k \cdot S \quad \text{Equation (A)},$$

where D is the transmission delay time depending on communication distance,
S is the packet size, and
k is the coefficient; and $$Q = k \cdot S \cdot \rho / (1 - \rho) \quad \text{Equation (B)},$$

where Q is the allowable residence delay time, and
$\rho$ is the allowable value for usage of the packet network; and $$\text{threshold value} = D + k \cdot S + Q \quad \text{Equation (C)}.$$

4. The detecting method according to claim 2, further comprising the step of:
calculating a threshold value for each packet size and each segment relating to a network structure of a packet network to which a source of packets belongs.

5. The detecting method according to claim 1, further comprising the step of:
calculating a reference value based on an average and a standard deviation of communication quality values within a range based on the threshold value; and
detecting a communication state by comparing the calculated reference value with communication quality values measured after the calculation.

6. A detecting device for detecting a communication state, said detecting device comprising:
a setting unit for setting a threshold value based on measured communication quality values regarding data transmitted in a packet network;
an extracting unit for extracting communication quality values from among measured communication quality values using the threshold value;
a first calculating unit for calculating a reference value using the extracted communication quality values; and
an applying unit for applying the reference value to detection of a communication state of the packet network.

7. The detecting device according to claim 6, wherein the communication quality values are delay times relating to transmission and reception of packets, and said detecting device further comprises:
an adding unit for adding up the delay times of a plurality of packets for each packet size;
a second calculating unit for calculating a delay time depending on packet size, based on a minimum value of delay times of each packet size; and
a third calculating unit for calculating a threshold value to be set, based on the minimum value of delay times of each packet size, the delay time depending on packet size, and an allowable residence delay time depending on an allowable value preset for usage of the packet network.

8. The detecting device according to claim 7, wherein said third calculating unit includes:
a fourth calculating unit for calculating a transmission delay time and a coefficient by using Equation (A) for each packet size, based on a relationship among a minimum value of delay times, a transmission delay time depending on communication distance, packet size, and a coefficient relating to the packet size;
a fifth calculating unit for calculating an allowable residence delay time by using Equation (B) based on an allowable value preset for usage of the packet network and the product of the coefficient and packet size; and
a sixth calculating unit for calculating a threshold value as the sum of the transmission delay time, the product of the coefficient and packet size, and the allowable residence delay time by using Equation (C), $$\text{minimum value of delay times of packet size } S = D + k \cdot S \quad \text{Equation (A)},$$

where D is the transmission delay time depending on communication distance,
S is the packet size, and
k is the coefficient;

$$Q = k \cdot S \cdot \rho / (1 - \rho) \quad \text{Equation (B)},$$

where Q is the allowable residence delay time,
$\rho$ is the allowable value for usage of the packet network; and $$\text{threshold value} = D + k \cdot S + Q \quad \text{Equation (C)}.$$

9. The detecting device according to claim 7, wherein said third calculating unit for calculating a threshold value calculates a threshold value for each packet size and each segment relating to a network structure of a packet network to which a source of packets belongs.

10. The detecting device according to claim 6, wherein said first calculating unit for calculating a reference value calculates a reference value based on an average and a standard deviation of communication quality values within a range based on the threshold value, and
said detecting unit for detecting a communication state detects a communication state by comparing the calculated reference value with communication quality values measured after the calculation.

11. A reference value calculating device for calculating a reference value relating to delay times measured for packets transmitted and received within a packet network, comprising:
an adding unit for adding up the measured delay times of a plurality of packets for each packet size;
a calculating unit for calculating a delay time depending on packet size, based on a minimum value of delay times of each packet size; and
a second calculating unit for calculating a reference value relating to delay times based on the minimum value of delay times of each packet size, the delay time depending on packet size, and an allowable residence delay time depending on an allowable value preset for usage of the packet network.

12. A non-transitory recording medium storing a program that causes a computer to execute a procedure, said procedure comprising:

setting a threshold value based on measured communication quality values regarding data transmitted in a packet network;
extracting communication quality values from among measured communication quality values using the threshold value;
calculating a reference value using the extracted communication quality values; and
applying the reference value to detection of a communication state of the packet network.

* * * * *